(12) United States Patent
Knost

(10) Patent No.: US 6,481,999 B2
(45) Date of Patent: Nov. 19, 2002

(54) TUNNEL BAKING OVEN

(75) Inventor: Dieter Knost, Dinkelsbühl (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 0 days.

(21) Appl. No.: 09/804,303

(22) Filed: Mar. 13, 2001

(65) Prior Publication Data

US 2001/0022178 A1 Sep. 20, 2001

(30) Foreign Application Priority Data

Mar. 14, 2000 (DE) .......................................... 100 12 388

(51) Int. Cl.$^7$ ................................................ F23N 1/00
(52) U.S. Cl. ................. 431/41 C; 126/21 A; 99/443 C; 432/175; 198/825
(58) Field of Search ............................... 126/21 A, 41 C; 99/443 C; 432/175; 198/952, 416, 463.6, 570, 575, 581, 590, 678.1, 825; 34/212, 216

(56) References Cited

U.S. PATENT DOCUMENTS

| | | | |
|---|---|---|---|
| 4,276,465 A | * 6/1981 | Flavio | .......................... 327/111 |
| 4,366,177 A | 12/1982 | Wells et al. | |
| 4,389,562 A | * 6/1983 | Chaudoir | ...................... 219/388 |
| 4,548,191 A | * 10/1985 | Hwang | .......................... 126/20 |
| 4,717,572 A | * 1/1988 | Buller-Colthurst | ........... 426/233 |
| 5,277,105 A | * 1/1994 | Bruno et al. | ................ 126/19 R |
| 5,619,911 A | * 4/1997 | Voegtlin | ..................... 126/21 A |
| 5,832,812 A | 11/1998 | Wolfe et al. | |
| 5,875,705 A | 3/1999 | Knost | |

FOREIGN PATENT DOCUMENTS

FR   5 23 235   8/1921

OTHER PUBLICATIONS

"Universal–Netzbandofen", 1962.

* cited by examiner

Primary Examiner—Henry Bennett
Assistant Examiner—Kathryn Ferko
(74) Attorney, Agent, or Firm—Browdy and Neimark, P.L.L.C.

(57) ABSTRACT

A tunnel baking oven comprises at least two oven trains, which are disposed side by side and parallel to a direction of throughput, having an inlet station and an outlet station. A baking chamber extends in each oven train from the inlet station as far as to the outlet station. Furthermore, provision is made for at least one energy cell heating the baking chambers. A continuous baking conveyor belt extends in each baking chamber from the inlet station as far as to the outlet station, the baking conveyor belts being drivable at the same rate as well as at different rates.

9 Claims, 5 Drawing Sheets

TUNNEL BAKING OVEN

BACKGROUND OF THE INVENTION

1. Field of the Invention

The invention relates to a tunnel baking oven.

2. Background Art

Continuous baking ovens, also designated as tunnel ovens, are generally known in baking technology. They have an inlet station and an outlet station, between which a continuously circulating belt is disposed, the upper strand of which is led through a continuous baking chamber, conveying the dough pieces there-through. A tunnel baking oven of the generic type may have only a single hearth or several hearths one above the other. The baking oven has an energy cell, by means of which to heat the baking chamber. For several reasons, in particular for constructional reasons, the width of these tunnel baking ovens, and in particular of the baking conveyor belts, is restricted. On the other hand, there are cases when a throughput is desired which is so high that overwide ovens are desirable, an arrangement of several hearths one above the other not being feasible for various reasons.

SUMMARY OF THE INVENTION

It is an object of the invention to embody a tunnel baking oven which offers an overwide design and various possibilities of employment accompanied with the simplest structure.

This object is attained in a tunnel baking oven comprising at least two oven trains, which are disposed side by side and parallel to a direction of throughput and which have an inlet station and an outlet station; a baking chamber, which runs from the inlet station as far as to the outlet station in each oven train; at least one energy cell heating the baking chambers; and a continuous baking conveyor belt, which runs from the inlet station as far as to the outlet station in each baking chamber, the baking conveyor belts being drivable in the same direction at the same rate as well as at different rates. Simplistically, the tunnel baking oven according to the invention comprises two tunnel ovens side by side, the oven trains, each having a baking conveyor belt of its own. Due to the fact that it is possible to operate the baking conveyor belts at an identical speed or each at different speeds, equal or varying baking times may lead to correspondingly identical or varying baking results. When an intermediate wall is provided between the baking chambers, and in particular when this intermediate wall is adjustable for change between a first position in which the baking chambers are connected with each other and a second position in which the baking chambers are separated from each other, this may help to set different baking atmospheres and temperatures in the two baking chambers, which may however also be equalized.

In keeping with an advantageous development, it is provided that only one oven train is equipped with an energy cell, and that the baking chamber of the other oven train is connectable to, and disconnectable from, the energy cell; and in particular that each oven train is equipped with a heating-gas flow pipe with the heating-gas flow pipes of both oven trains being connectable to, and disconnectable from, each other; and that each oven train is equipped with a heating-gas return pipe with the heating-gas return pipes of both oven trains being connectable to, and disconnectable from, each other. This ensures that a single energy cell will be sufficient to heat a single baking chamber or both baking chambers. Equal or different baking conveyor belt speeds are attained in keeping with the embodiment according to which each baking conveyor belt is led along a driving roller, with each driving roller being drivable by a driving motor and the driving rollers being coupled with each other; and according to which an engaging and disengaging coupling is provided between the driving rollers; and according to which the driving motors are electrically coupled with each other.

Further features, details and advantages of the invention will become apparent from the ensuing description of an exemplary embodiment, taken in conjunction with the drawing.

DESCRIPTION OF THE PREFERRED EMBODIMENT

Figure 1:
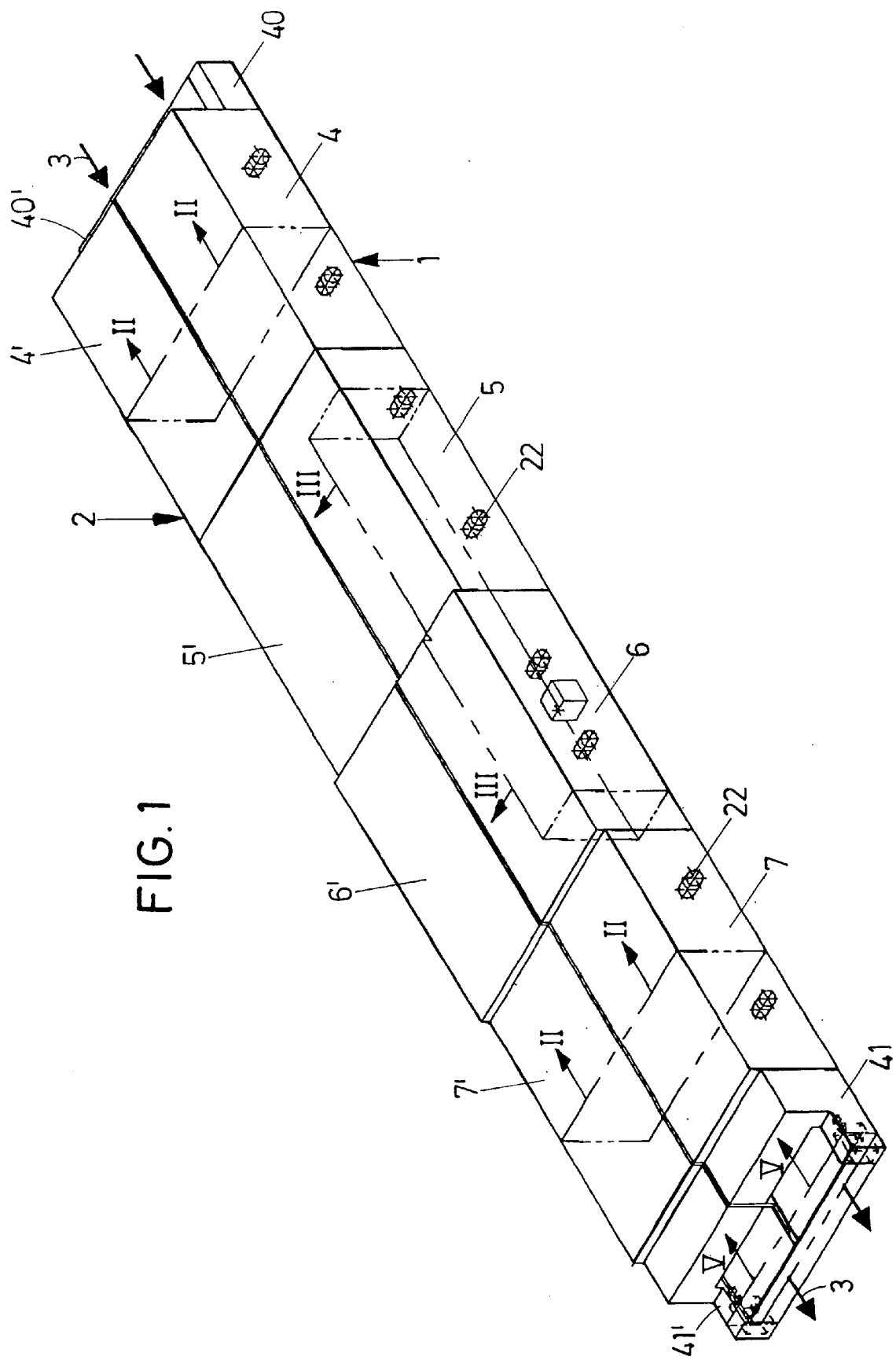
FIG. 1 is a strongly simplified, perspective view of a tunnel baking oven.

The tunnel oven seen in FIG. 1 is a continuous oven, namely a so-called overwide tunnel oven. It comprises two oven trains 1, 2 which are disposed directly side by side and parallel to each other—related to the direction of throughput 3. In as much as they have identical parts, these are designated by a reference numeral for the oven train 1 and by the same reference numeral provided with a prime for the oven train 2, there being no need of renewed specification in each case. Each oven train 1, 2 comprises several oven modules 4, 4', 5, 5', 6, 6', 7, 7'. The oven trains 1, 2 are disposed substantially in mirror symmetry. The modules 4, 4', 5, 5', 7, 7' are identical. According to FIG. 2, each module 4 to 7' has an approximately cuboid baking chamber 8, 8', with the baking chambers 8, 8' of each oven train 1, 2 being disposed one after the other and in alignment in the direction of throughput. In the following, they are also designated as a baking chamber 8 and 8', respectively, of an oven train 1 and 2, respectively.

Each baking chamber 8, 8' has upper heating elements 9, 9' and lower heating elements 10, 10' which are pipe elements formed by heating-gas pipes 11, 11' which run in the direction of throughput 3 and are disposed side by side at a small distance so that air may pass between them and can be heated.

Each oven module 4 to 7' has a lower wall 12, 12', a side wall 13, 13' and an upper wall 14, 14', which are provided with a thick heat insulation 15, 15'. The baking chambers 8, 8' are open towards each other, but may be separated partially or entirely from each other by a movable, swordlike intermediate wall 16. This intermediate wall 16, which extends in the direction of throughput 3, may be adjusted vertically via a rack 18 by means of a servomotor 17.

The upper heating elements 9 are disposed in the lower portion of an upper baking-atmosphere chamber 19, 19', whereas the lower heating elements 10, 10' are disposed in the upper portion of a lower baking-atmosphere chamber 20, 20'. The chambers 19, 20 and 19', 20', respectively, are connected with each other by a baking-atmosphere duct 21, 21', with a baking-atmosphere-recirculation fan 22, 22' being disposed therein for actuation in two directions of rotation by its driving motor 23, 23' so that the baking atmosphere may flow corresponding to the double-headed arrow of flow direction 24, 24' from below through the lower chamber 20, 20', the lower heating elements 10, 10', the baking chamber 8, 8', the upper heating elements 9, 9', the upper chamber 19, 19' or in the reversed direction. A baking-atmosphere-regulating flap 25, 25' is disposed in each chamber 19, 19' and 20, 20'; it is pivotal about an axis 26, 26' which adjoins the neighboring baking chamber 8 and 8' and runs in the direction of throughput 3. The flap 25, 25' has passages 27, 27' for the baking atmosphere so that the distribution of the baking atmosphere may be influenced horizontally and crosswise of the direction of throughput 3 in the baking chamber 8, 8'.

Each upper baking-atmosphere chamber 19, 19' is connected to a fumes exhaust line 28, i.e. the baking atmosphere prevailing in the baking chamber 8 and 8' can be sucked off. Suck-off control takes place via regulating flaps 29 which are disposed between the chambers 19 and 19' and the exhaust line 28 and 28'.

Figure 2:
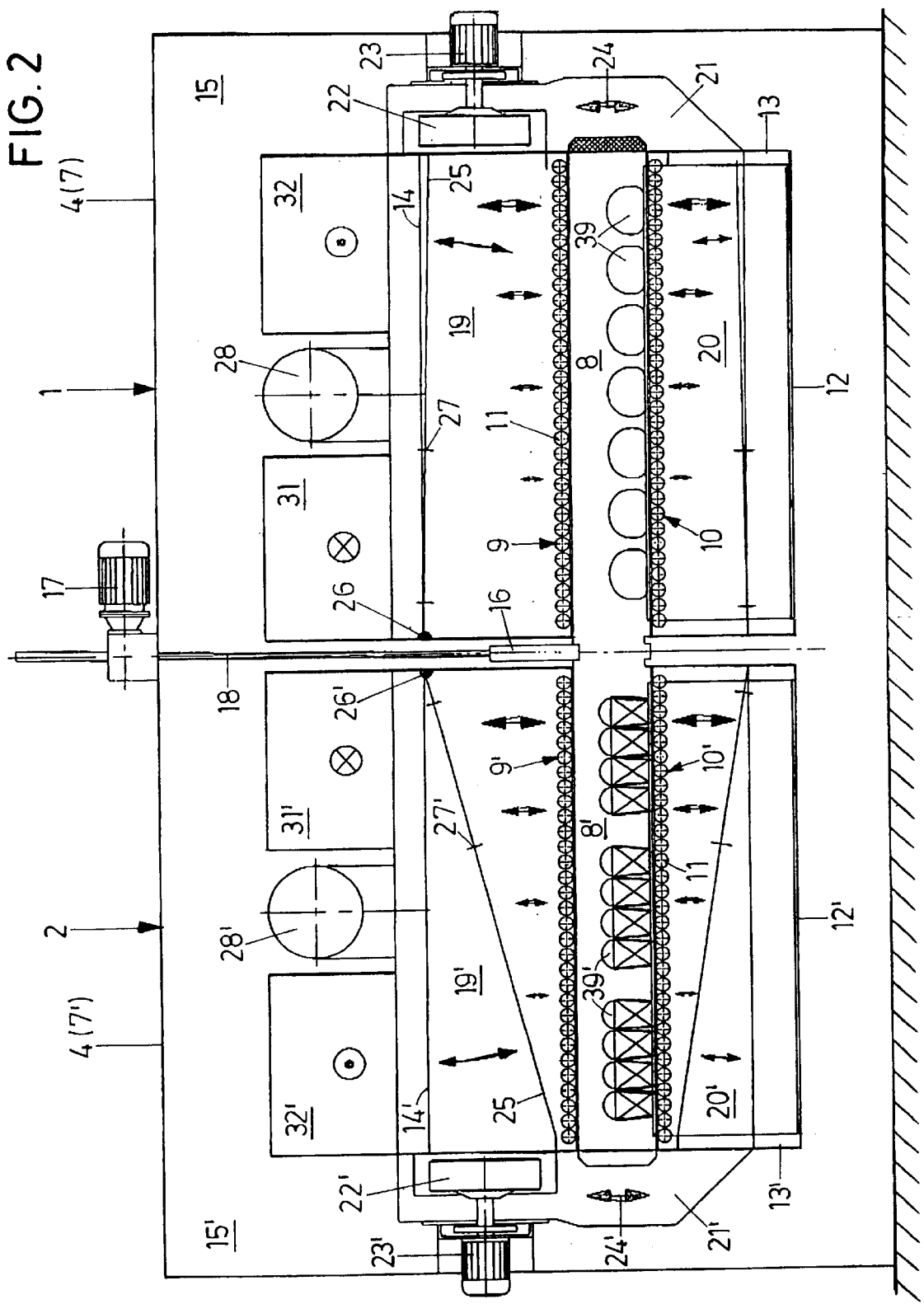
FIG. 2 is a cross-sectional view through the oven in a cross-sectional plane II—II.
Figure 3:
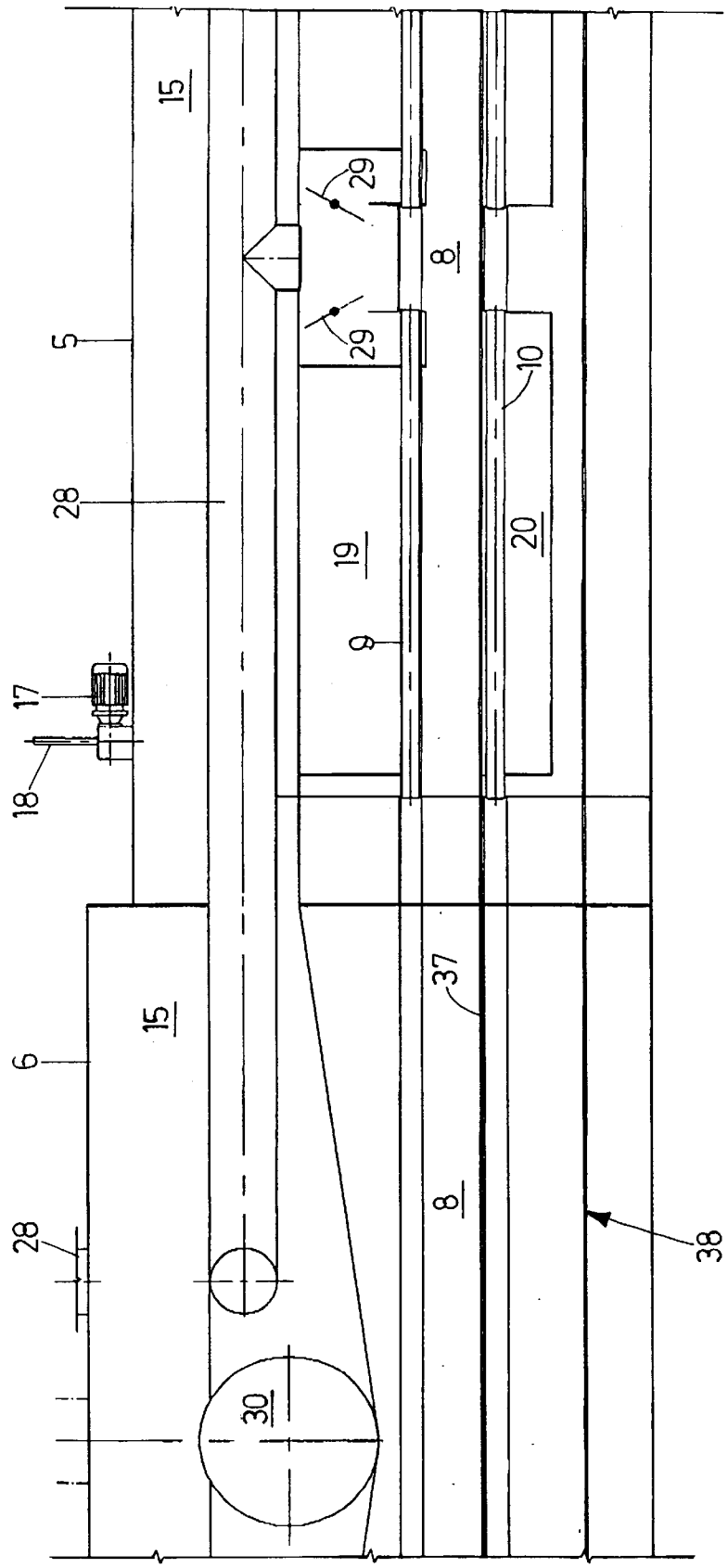
FIG. 3 is a partial longitudinal section through the baking oven corresponding to the longitudinal sectional plane III—III of FIG. 1.

If each oven train 1, 2 comprises an energy cell 30 of its own (roughly outlined), for instance a burner unit, then this is disposed in the oven modules 6, 6' as seen in FIGS. 2 and 3. It is joined to heating-gas flow pipes 31, 31' which run above the upper baking-atmosphere chamber 19 and 19' and from which the heating gas is supplied to the heating elements 9, 10 and 9', 10'. These heating elements 9, 10 and 9', 10' are again joined to heating-gas return pipes 32, 32' which return the cooled heating gas to the energy cell 30. If each oven train 1, 2 has an energy cell 30 of its own, then entirely different baking conditions may be adjusted in the baking chamber 8 and 8' of the individual oven trains 1, 2 when the intermediate wall 16 is closed.

Figure 4:
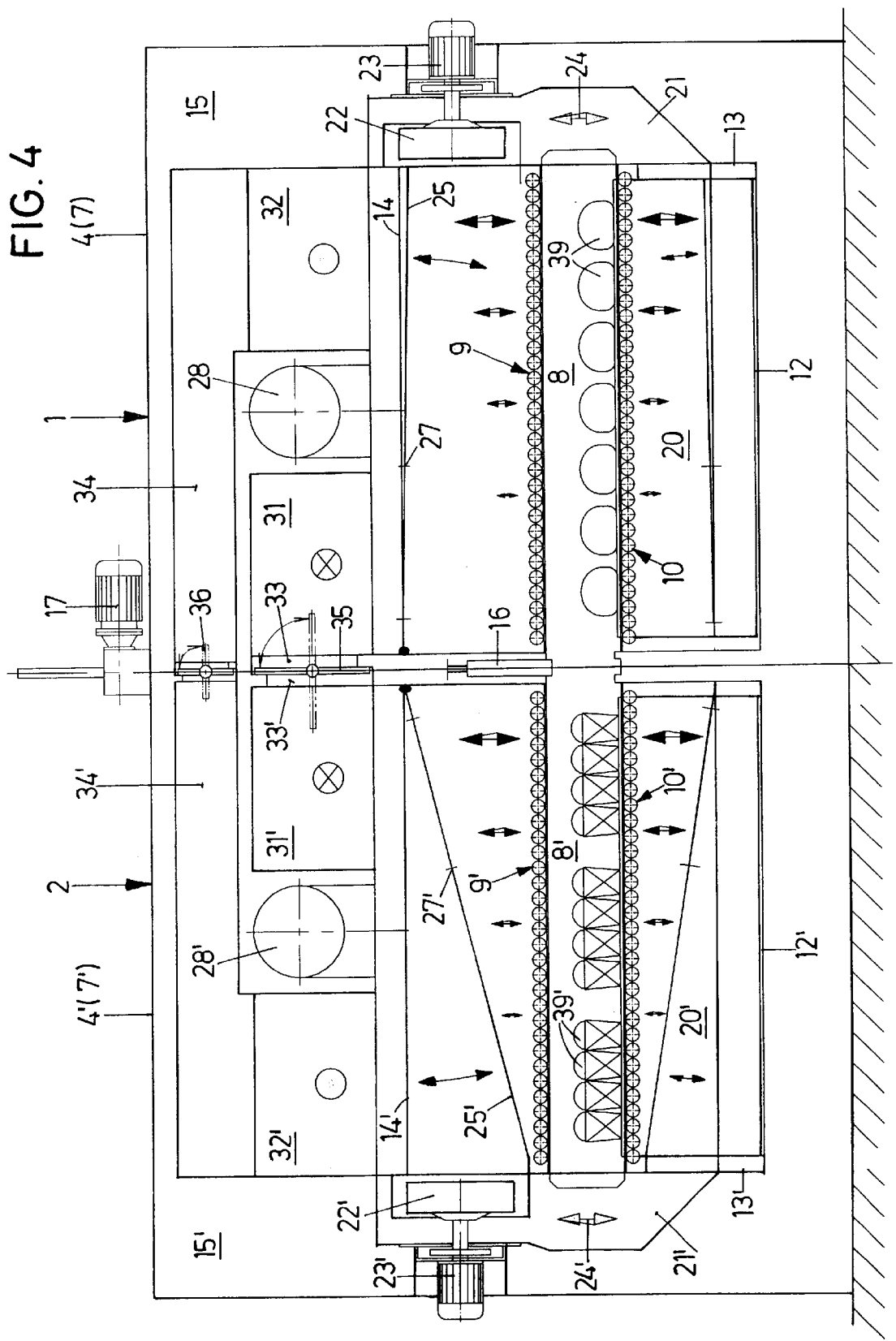
FIG. 4 is an illustration, corresponding to FIG. 2, of a modified embodiment.

If however only a single energy cell 30 is available in one of the oven modules 6 and 6', then the flow pipes 31 and 31' and the return pipes 32, 32'—as seen in FIG. 4—are connected with each other by means of connecting pipes 33, 33' and 34, 34', respectively, in which heating-gas-flow control flaps 35 and heating-gas-return control flaps 36 are disposed, which are illustrated in solid lines in FIG. 4 for their closed condition and in dot-dashed lines for the opened condition. By means of these control flaps 35, 36, operation of only a single oven train 1, 2 or of both oven trains 1, 2 is feasible. Corresponding positioning of the control flaps 35, 36 ensures that varying quantities of heating gas may be supplied to the oven trains 1, 2 and that varying baking chamber conditions may be set in the two oven trains 1, 2.

Figure 5:
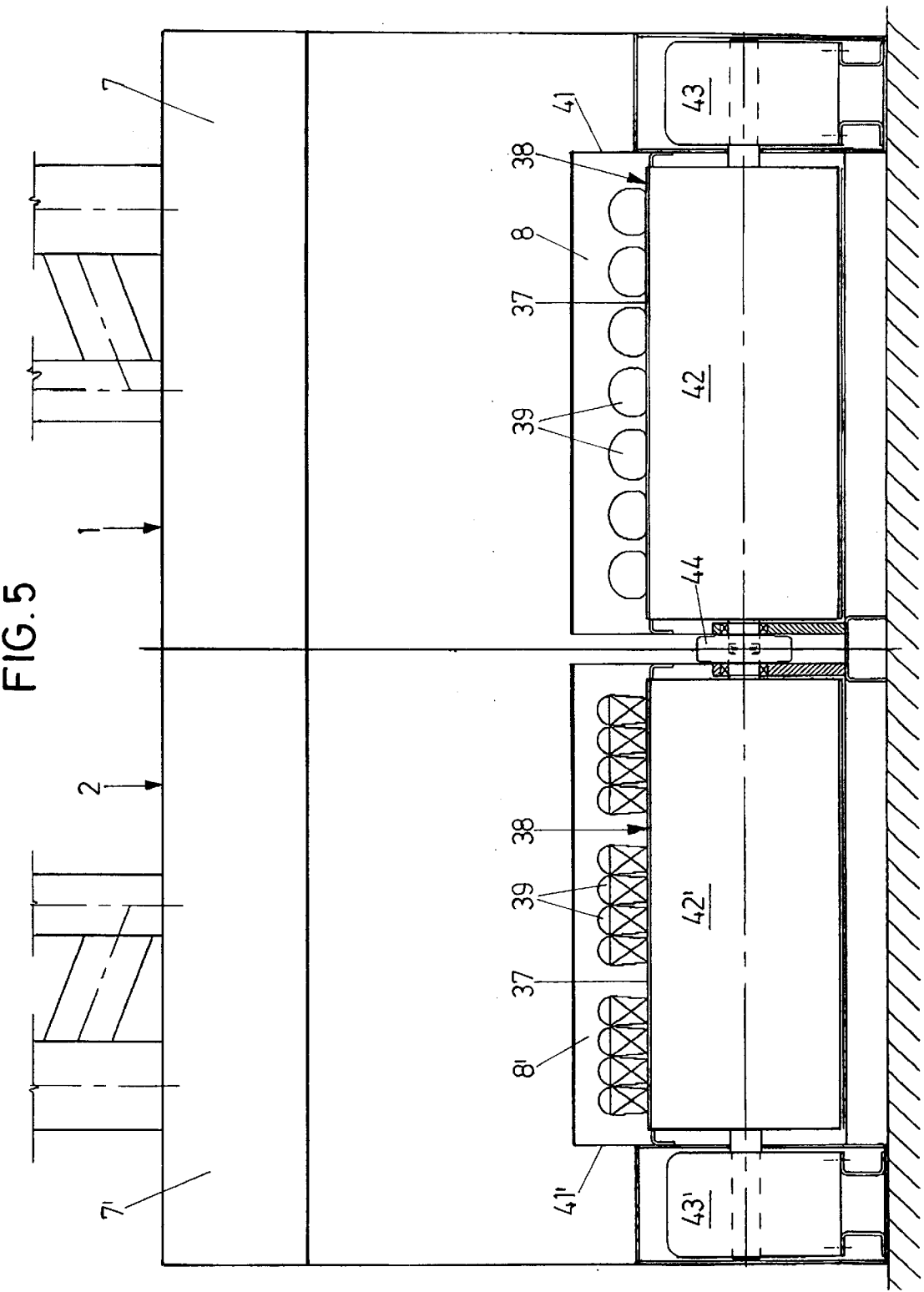
FIG. 5 is a cross-sectional view through the outlet station of the baking oven corresponding to the cross-sectional plane V—V of FIG. 1.

As seen in particular in FIG. 5, the upper strand 37, 37' of a continuous baking conveyor belt 38, 38' passes through the baking chambers 8, 8' and is led directly above the lower heating elements 10, 10'. It is air permeable, for instance in the form of a netted belt. Dough pieces 39, 39' are conveyed and baked on the respective baking conveyor belt 38 and 38' in the direction of throughput 3 through the respective oven train 1, 2, with the drawing showing round bread loaves as one type of dough pieces 39 and square loaves as the other type of dough pieces 39'. The dough pieces 39, 39' are fed into the respective oven train 1, 2 in an inlet station 40, 40' which is disposed upstream of the first oven module 4, 4' and which simultaneously constitutes the belt deflection station. The baked dough pieces 39, 39' are removed from the respective oven train 1, 2 in an outlet station 41, 41' which simultaneously constitutes the belt driving station. Provided in each outlet station 41, 41' is a driving roller 42, 42' for each baking conveyor belt 38, 38', which is drivable by an independently controllable driving motor 43, 43'. Synchronous running of the baking conveyor belts 38, 38', i.e. driving the two baking conveyor belts 38, 38' at the same conveying rate, may take place by means of an engaging and disengaging coupling 44 between the driving rollers 42, 42'. When the coupling 44 is engaged, only a single driving motor 43, 43' must be actuated; however, also both driving motors 43, 43' may be actuated by corresponding forced synchronization via the coupling 44. Furthermore, a purely electronic or electric synchronizing control may be provided between the driving motors 43 and 43'. Fundamentally, it is also conceivable to provide three oven trains one beside the other. In this case the driving roller of the central oven train would have to be embodied for connection with the driving roller of the left oven train or with the driving roller of the right oven train via a corresponding coupling so that optionally, either the driving roller of the left oven train would be actuated together with the driving roller of the central oven train or the driving roller of the right oven train would be actuated together with the driving roller of the central oven train.

What is claimed is:

1. A tunnel baking oven comprising
   at least two tunnel oven units (1, 2), which are disposed side by side and parallel to a direction of throughput (3) and
   which have an inlet station (40, 40') and
   an outlet station (41, 41');
   a baking chamber (8, 8'), which runs from the inlet station (40, 40') as far as to the outlet station (41, 41') in each tunnel oven unit (1, 2) which can be run independently of each other;
   at least one burner (30) heating the baking chambers (8, 8'); and
   a continuous baking conveyor belt (38, 38'), which runs from the inlet station (40, 40') as far as to the outlet station (41, 41') in each baking chamber (8, 8'), the baking conveyor belts (38, 38') being drivable in the same direction and control means for operating each tunnel oven unit independently at the same rate or at different rates;
   wherein an intermediate wall (16) is provided between the baking chambers (8, 8'); and
   wherein the intermediate wall (16) is adjustable for change between a first position in which the baking chambers (8, 8') are connected with each other and a second position in which the baking chambers (8, 8') are separated from each other.

2. A tunnel baking oven according to claim 1, wherein only one oven tunnel unit (1, 2) is equipped with a burner (30); and wherein the baking chamber (8, 8') of the other oven train (2, 1) is connectable by heating gas flow control flaps (35) to, and disconnectable by heating gas return control flaps (36) from, the burner (30).

3. A tunnel baking oven according to claim 2, wherein each tunnel oven unit (1, 2) is equipped with a heating-gas flow pipe (31, 31'); and wherein the heating-gas flow pipes (31, 31') of both oven trains (1, 2) are connectable to, and disconnectable from, each other.

4. A tunnel baking oven according to claim 2, wherein each tunnel oven unit (1, 2) is equipped with a heating-gas return pipe (32, 32'); and wherein the heating-gas return pipes (32, 32') of both tunnel oven units (1, 2) are connectable to, and disconnectable from, each other.

5. A tunnel baking oven according to claim 1, wherein each baking conveyor belt (38, 38') is led along a driving roller (42, 42'); wherein each driving roller (42, 42') is drivable by a driving motor (43, 43'); and wherein the driving rollers (42, 42') are coupled with each other.

6. A tunnel baking oven according to claim 5, wherein an engaging and disengaging coupling (44) is provided between the driving roller (42, 42').

7. A tunnel baking oven according to claim 5, wherein the driving motors (43, 43') are electrically coupled with each other.

8. A tunnel baking oven according to claim 1, wherein the tunnel oven units (1) are structured substantially in mirror symmetry.

9. A tunnel baking oven according to claim 3, wherein each tunnel oven unit (1, 2) is equipped with a heating-gas return pipe (32, 32'); and wherein the heating-gas return pipes (32, 32') of both tunnel oven units (1, 2) are connectable to, and disconnectable from, each other.

* * * * *